United States Patent
Liu et al.

(10) Patent No.: US 7,037,956 B2
(45) Date of Patent: May 2, 2006

(54) WATER-SOLUBLE RESIN, PROCESS FOR ITS PRODUCTION AND WATER-SOLUBLE RESIN COMPOSITION

(75) Inventors: Xiang Liu, Kawasaki (JP); Tomomi Onitake, Kawasaki (JP); Toshihiro Inoue, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/399,393

(22) PCT Filed: Oct. 19, 2001

(86) PCT No.: PCT/JP01/09205
§ 371 (c)(1),
(2), (4) Date: Apr. 21, 2003

(87) PCT Pub. No.: WO02/32971
PCT Pub. Date: Apr. 25, 2002

(65) Prior Publication Data
US 2004/0024158 A1  Feb. 5, 2004

(30) Foreign Application Priority Data
Oct. 20, 2000  (JP) .............................. 2000-321017

(51) Int. Cl.
*C08K 3/10*  (2006.01)

(52) U.S. Cl. .......................... 523/122; 523/130; 524/3; 524/4; 524/43; 524/44; 524/45; 524/436; 524/457; 524/458; 524/459

(58) Field of Classification Search ................ 524/459, 524/3, 4, 43, 436, 44, 45, 457, 458; 523/122, 523/130; 525/54.3, 56
See application file for complete search history.

(56) References Cited

U.S. PATENT DOCUMENTS

| | | | | |
|---|---|---|---|---|
| 5,240,771 A | * | 8/1993 | Brueckmann et al. | 428/395 |
| 5,705,553 A | * | 1/1998 | Kuropka | 524/459 |
| 6,251,556 B1 | * | 6/2001 | Yoshida et al. | 430/109.3 |

FOREIGN PATENT DOCUMENTS

| | | |
|---|---|---|
| JP | 07-070254 | 3/1995 |
| JP | 10-287836 | 10/1998 |

OTHER PUBLICATIONS

Translation of JP 10-287836, Oct. 27, 1998.*

* cited by examiner

*Primary Examiner*—Bernard Lipman
(74) *Attorney, Agent, or Firm*—Armstrong, Kratz, Quintos, Hanson & Brooks, LLP

(57) ABSTRACT

A water-soluble resin composition comprising a water-soluble resin and a colorant, which copolymer has a weight average molecular weight of at least 8,000 and is prepared by polymerizing an ethylenically unsaturated carboxylic acid monomer and a monomer copolymerizable therewith in the presence of an alcoholic hydroxyl group-containing water-soluble high polymer or a copolymerizable surface active agent to give a copolymer having an acid value in the range of 5 to 120 and then neutralizing the thus-obtained copolymer with a basic, exhibits a reduced viscosity change when it is stored for a long period, and is useful as an aqueous ink capable of giving an image having good dot reproducibility and good abrasion resistance.

5 Claims, No Drawings

WATER-SOLUBLE RESIN, PROCESS FOR ITS PRODUCTION AND WATER-SOLUBLE RESIN COMPOSITION

TECHNICAL FIELD

This invention relates to a water-soluble resin, a process for producing the water-soluble resin, and a water-soluble resin composition. More specifically it relates to a water-soluble resin composition exhibiting a reduced viscosity change when it is stored for a long period and giving an image having good dot reproducibility and abrasion resistance; a water-soluble resin used for the water-soluble resin composition; and a process for producing the water-soluble resin.

BACKGROUND ART

Water-soluble resin compositions comprising a water-soluble resin and a colorant are publicly known. For example, an aqueous ink comprised of a water-soluble resin and a colorant is being put to practical use as a substitute for an organic solvent-type ink having a problem of environmental pollution. However, the aqueous ink tends to exhibit a large viscosity change when it is stored for a long period, and give an image of poor reproducibility. Thus an aqueous ink exhibiting a reduced viscosity change when it is stored for a long period, and giving an image of good reproducibility is desired. Further, it is required that dot or fine line images developed therefrom have good reproducibility and exhibit good resistance to abrasion and mar. These desired characteristics are greatly influenced by the properties of a water-soluble resin contained in the aqueous ink.

An aqueous ink comprising a specific carbon black and a water-soluble resin having an acid value of at least 100 and a weight average molecular weight in the range of 3,000 to 7,000 in an aqueous medium is disclosed in Japanese Unexamined Patent Publication (hereinafter abbreviated to "JP-A") No. H4-18467. This aqueous ink exhibits reduced viscosity change when it is stored for a long period, but the resulting image has poor dot reproducibility and poor abrasion resistance.

JP-A H7-70254 discloses a water-soluble resin which is a copolymer prepared by copolymerizing 21% to 99% by weight of an ethylenically unsaturated carboxylic acid monomer with the remainder of other copolymerizable monomer in the presence of polyvinyl alcohol, and neutralizing the thus-obtained highly acidic copolymer with a basic compound. An aqueous ink comprising this water-soluble resin and a colorant exhibits a large viscosity change when it is stored for a long period, and gives images having poor abrasion resistance.

DISCLOSURE OF THE INVENTION

In view of the foregoing, primary objects of the present invention are to provide a water-soluble resin composition exhibiting a reduced viscosity change when it is stored for a long period and giving an image having good dot reproducibility and abrasion resistance; a water-soluble resin used for the water-soluble resin composition; and a process for producing the water-soluble resin.

To attain the above-mentioned objects, the present inventors made extensive research, and found that the objects of the present invention are attained by using a salt of a copolymer having a certain acid value and a relatively high molecular weight which is prepared by copolymerizing an ethylenically unsaturated carboxylic acid monomer in the presence of a specific water-soluble high polymer or a copolymerizable surface active agent. Based on this finding, the present invention has been completed.

Thus in accordance with the present invention, there are provided:

(1) a water-soluble resin which is a copolymer having a weight average molecular weight of at least 8,000; said copolymer being prepared by polymerizing an ethylenically unsaturated carboxylic acid monomer and a monomer copolymerizable therewith in the presence of an alcoholic hydroxyl group-containing water-soluble high polymer or a copolymerizable surface active agent to give a copolymer having an acid value in the range of 5 to 120 and then neutralizing the thus-obtained copolymer with a basic substance;

(2) an aqueous water-soluble resin solution for ink comprising the water-soluble resin as described in (1) above;

(3) a process for producing the water-soluble resin as described in (1) above, characterized in that an ethylenically unsaturated carboxylic acid monomer and a monomer copolymerizable therewith are polymerized in the presence of an alcoholic hydroxyl group-containing water-soluble high polymer or a copolymerizable surface active agent in an aqueous medium to give a copolymer, and then, the thus-obtained copolymer is neutralized with a basic substance; and, (4) a water-soluble resin composition comprising the water-soluble resin as described claim (1) above.

BEST MODE FOR CARRYING OUT THE INVENTION

The water-soluble resin of the present invention is a copolymer having a weight average molecular weight of at least 8,000, which has been prepared by polymerizing an ethylenically unsaturated carboxylic acid monomer and a monomer copolymerizable therewith in the presence of an alcoholic hydroxyl group-containing water-soluble high polymer or a copolymerizable surface active agent to give a copolymer having an acid value in the range of 5 to 120 (which copolymer is hereinafter referred to as "alkali-soluble copolymer" when appropriate), and then neutralizing the alkali-soluble copolymer with a basic substance.

The ethylenically unsaturated carboxylic acid monomer is not particularly limited, and, as specific examples thereof, there can be mentioned α, β-ethylenically unsaturated monocarboxylic acid monomers such as acrylic acid and methacrylic acid; ethylenically unsaturated polycarboxylic acid monomers such as itaconic acid, maleic acid, fumaric acid and butenetricarboxylic acid; partial ester monomers of ethylenically unsaturated polycarboxylic acid monomers such as monobutyl fumarate, monobutyl maleate and mono-2-hydroxypropyl maleate; and ethylenically unsaturated polycarboxylic acid anhydride monomers such as maleic anhydride and citraconic anhydride. Of these, α, β-ethylenically unsaturated monocarboxylic acid monomers are preferable. Methacrylic acid is especially preferable. Theses monomers may be used either alone or as a combination of at least two thereof.

The amount of ethylenically unsaturated carboxylic acid monomer is such that the alkali-soluble copolymer has an acid value in the range of 5 to 120, preferably 10 to 90 and more preferably 30 to 80. If the copolymer has an acid value of smaller than 5, it is not soluble in an alkali. In contrast, if the copolymer has an acid value of larger than 120, the resulting water-soluble resin composition exhibits a large viscosity change when it is stored for a long period, and gives an image of poor abrasion resistance.

The other monomer copolymerizable with the ethylenically unsaturated carboxylic acid monomer is also not particularly limited, and, as specific examples thereof, there can be mentioned aromatic vinyl monomers such as styrene, α-methylstyrene, vinyltoluene and chlorostyrene; α, β-ethylenically unsaturated carboxylic acid ester monomers such as methyl acrylate, ethyl acrylate, propyl acrylate, butyl acrylate, isobutyl acrylate, n-amyl acrylate, isoamyl acrylate, n-hexyl acrylate, 2-ethylhexyl acrylate, n-octyl acrylate, 2-hydroxyethyl acrylate, hydroxypropyl acrylate, glycidyl acrylate, methyl methacrylate, ethyl methacrylate, propyl methacrylate, butyl methacrylate, isobutyl methacrylate, n-amyl methacrylate, isoamyl methacrylate, n-hexyl methacrylate, 2-ethylhexyl methacrylate, n-octyl methacrylate, 2-hydroxyethyl methacrylate, hydroxypropyl methacrylate and glycidyl methacrylate; α, β-ethylenically unsaturated nitrile monomers such as acrylonitrile and methacrylonitrile; ethylenically unsaturated glycidyl ether monomers such as allyl glycidyl ether; α, β-ethylenically unsaturated amide monomers such as acrylamide, N-methylolacrylamide, N-butoxymethylacrylamide, methacrylamide, N-methylolmethacrylamide and N-butoxymethylmethacrylamide; conjugated diene monomers such as 1,3-butadiene, isoprene, 2,3-dimethyl-1,3-butadiene and 1,3-pentadiene; and carboxylic acid vinyl ester monomers such as vinyl acetate. Of these, α, β-ethylenically unsaturated carboxylic acid ester monomers are preferable because the resulting image has good luster and good gross. Methyl methacrylate and ethyl acrylate are especially preferable. These monomers may be used either alone or as a combination of at least two thereof.

The alkali-soluble copolymer is prepared by copolymerizing the above-mentioned ethylenically unsaturated carboxylic acid monomer and copolymerizable monomer in the presence of an alcoholic hydroxyl group-containing water-soluble high polymer or a copolymerizable surface active agent (these water-soluble high polymer and surface active agent are hereinafter collectively referred to as "dispersion stabilizer" when appropriate) preferably in an aqueous medium. Of these dispersion stabilizers, an alcoholic hydroxyl group-containing water-soluble high polymer is preferable because the resulting water-soluble resin composition exhibits very reduced viscosity change when it is stored for a long period, and gives an image having excellent dot reproducibility.

The alcoholic hydroxyl group-containing high polymer as used in the present invention means a water-soluble high polymer having 5 to 25 alcoholic hydroxyl groups per molecular weight of 1,000. As specific examples of the alcoholic hydroxyl group-containing high polymer, there can be mentioned vinyl alcohol polymers such as polyvinyl alcohol and its modification products; saponification products of copolymer of vinyl acetate with acrylic acid, methacrylic acid or maleic anhydride; cellulose derivatives such as alkyl cellulose, hydroxyalkyl cellulose and alkylhydroxyalkyl cellulose; starch derivatives such as alkyl starch, carboxymethyl starch and oxidized starch; gum arabic and tragacanth gum; and polyalkylene glycol. Of these, vinyl alcohol polymers are preferable because a water-soluble high polymer having good and stable quality is readily available.

The weight average molecular weight of the alcoholic hydroxyl group-containing high polymer is not particularly limited, but is usually in the range of 1,000 to 500,000, preferably 2,000 to 300,000. If the weight average molecular weight is smaller than 1,000, dispersion stabilizing effect is poor. In contrast, it is larger than 500,000, a polymerization system containing the alcoholic hydroxyl group-containing high polymer as a dispersion stabilizer has a too high viscosity to conduct polymerization without difficulty.

The amount of the alcoholic hydroxyl group-containing high polymer used is preferably in the range of 0.05 to 20 parts by weight, more preferably 1 to 10 parts by weight, based on 100 parts by weight of the total monomers. If the amount of this dispersion stabilizer is smaller than 0.05 part by weight, the dispersion stabilizing effect is poor and agglomerates are liable to occur at polymerization. In contrast, if the amount of this dispersion stabilizer is larger than 20 parts by weight, a polymerization system containing the alcoholic hydroxyl group-containing high polymer has a too high viscosity to conduct polymerization without difficulty.

The copolymerizable surface active agent as used in the present invention means a surface active agent having at least one copolymerizable vinyl group in the molecule. As specific examples of the copolymerizable surface active agent, there can be mentioned anionic polymerizable surface active agents such as sodium propenyl-2-ethylhexylsulfosuccinate ester, acrylic acid polyoxyethylenesulfate ester, methacrylic acid polyoxyethylenesulfate ester, ammonium polyoxyethylene-alkyl-propenyl-ether sulfate ester, acrylic acid polyoxyethylene ester phosphate ester and methacrylic acid polyoxyethylene ester phosphate ester; and nonionic polymerizable surface active agents such as polyoxyethylenealkylbenzene-ether acylic acid ester, polyoxyethylene-alkylbenzene-ether methacylic acid ester, polyoxyethylene-alkyl-ether acylic acid ester and polyoxyethylenealkyl-ether methacylic acid ester. Of these, ammonium polyoxyethylene-alkyl-propenyl-ether sulfate is preferable because it has good and balanced emulsion-dispersibility for monomers and copolymerizability with monomers.

The amount of copolymerizable surface active agent is preferably in the range of 0.01 to 5.0 parts by weight, more preferably 0.05 to 5.0 parts by weight and especially preferably 0.1 to 3.0 parts by weight, based on 100 parts by weight of the monomers. If the amount of copolymerizable surface active agent is smaller than 0.01 part by weight, emulsion stability is poor and hence a large amount of agglomerates are deposited at polymerization. In contrast, if the amount of copolymerizable surface active agent is larger than 5.0 parts by weight, the resultant water-soluble resin composition tends to easily foam.

In the polymerization for producing the alkali-soluble copolymer, it is preferable not to use, in combination with the copolymerizable surface active agent, a non-polymerizable surface active agent which is conventionally used for an emulsion polymerization. In the case when a non-polymerizable surface active agent is used, its amount should preferably be smaller than 0.05 part by weight based on 100 parts by weight of the monomers. If a large amount of a non-polymerizable surface active agent is used, the resulting water-soluble resin composition tends to give an image of poor water resistance.

At polymerization, the dispersion stabilizer and the monomer mixture may be added into a polymerization vessel either in one lot before the commencement of polymerization, or in two or more lots or continuously so that part thereof is added after the commencement of polymerization. In the case when they are added in two or more lots, the amount of each lot may be the same or different. In the case when they are added continuously, the rate of addition may be maintained at constant or be varied with the progress of polymerization.

The dispersion stabilizer and the monomer mixture can be added either separately, or as a mixture thereof in the form of a monomer dispersion comprising the dispersion stabilizer, the monomer mixture and water. In the case when the dispersion stabilizer and the monomer mixture are added separately, the addition of these ingredients are preferably substantially simultaneously commenced. If a large amount of the monomer mixture is added prior to the addition of the dispersion stabilizer, agglomerates tend to be deposited. In contrast, if a large amount of the dispersion stabilizer is added prior to the addition of the monomer mixture, the polymerization mixture tends to become viscous, or agglomerates tend to be deposited. The addition of these ingredients may not always be completed at the same time, but preferably be completed substantially simultaneously.

As the procedure for adding the above-mentioned ingredients, a procedure wherein a mixture thereof in the form of a monomer dispersion comprising the dispersion stabilizer, the monomer mixture and water is continuously added into a polymerization vessel is preferable. This is because the distribution of ethylenically unsaturated carboxylic acid monomer unit chains in the polymer chains of alkali-soluble copolymer becomes uniform when this procedure is adopted.

A polymerization initiator which can be used for the production of the alkali-soluble copolymer is not particularly limited. As specific examples of the polymerization initiator, there can be mentioned inorganic peroxides such as sodium persulfate, potassium persulfate, ammonium persulfate, potassium perphosphate and hydrogen peroxide; organic peroxides such as diisopropylbenzene hydroperoxide, cumene hydroperoxide, t-butyl hydroperoxide, 1,1,3,3-tetramethylbutyl hydroperoxide, di-t-butyl hydroperoxide, isobutyrile peroxide and bezoyl peroxide; and azo compounds such as azobisisobutyronitrile, azobis-2,4-dimethylvaleronitrile and methyl azobisisobutyrate. Of these, persulate salts such as potassium persulate and ammonium persulfate are preferable. These polymerization initiators may be used either alone or as a combination of at least two thereof.

The amount of polymerization initiator varies depending upon the particular kind thereof, but is preferably in the range of 0.5 to 5 parts by weight, more preferably 0.8 to 4 parts by weight, based on 100 parts by weight of the monomers.

These polymerization initiators may be used as a redox polymerization initiator, i.e., as a combination thereof with a reducing agent. The reducing agent is not particularly limited, and, as specific examples thereof, there can be mentioned compounds containing a metal ion of a reduced state such as ferrous sulfate and cuprous naphthenate; sulfonic acid compounds such as sodium methanesulfonate; and amine compounds such as dimethylaniline. These reducing agents may be used either alone or as a combination of at least two thereof.

The amount of reducing agent varies depending upon the particular kind thereof, but is preferably in the range of 0.03 to 10 parts by weight based on one part by weight of the polymerization initiator.

To modify the weight average molecular weight of the alkali-soluble copolymer, a chain transfer agent is preferably used at polymerization. As specific examples of the chain transfer agent, there can be mentioned mercaptans such as t-dodecyl mercaptan and n-dodecyl mercaptan; α-methylstyrene dimer; sulfides such as dimethylxanthogen disulfide and diisopropylxanthogen disulfide; nitrile compounds such as 2-methyl-3-butenenitrile and 3-pentenenitrile; thioglycollic acid esters such as methyl thioglycollate, propyl thioglycollate and octyl thioglycollate; and β-mercaptopropionic acid esters such as methyl β-mercaptopropionate and octyl β-mercaptopropionate. Of these, thioglycollic acid esters are preferable. Octyl thioglycollate is especially preferable. These chain transfer agents may be used either alone or as a combination of at least two thereof.

The amount of chain transfer agent is preferably in the range of 0.1 to 5 parts by weight, more preferably 0.5 to 4 parts by weight, based on 100 parts by weight of the monomers. If the amount of chain transfer agent is too small, the alkali-soluble copolymer exhibits high viscosity after neutralization, and becomes difficult to handle. In contrast, if the amount of chain transfer agent is too large, the resulting copolymer has too small molecular weight, which is lower than the weight average molecular weight acceptable in the present invention.

The procedure for adding the chain transfer agent is not particularly limited. The chain transfer agent may be added either at once, or intermittently or continuously to a polymerization system.

The polymerization temperature for the production of the alkali-soluble copolymer is usually in the range of 0 to 100° C., preferably 30 to 90° C. The polymerization conversion is usually at least 90% by weight, preferably at least 95% by weight.

The water-soluble resin of the present invention is prepared by neutralizing the alkali-soluble copolymer with a basic substance. As specific examples of the basic substance, there can be mentioned alkali metal hydroxides such as sodium hydroxide and potassium hydroxide; alkaline earth metal hydroxides such as calcium hydroxide and magnesium hydroxide; ammonia; and amines such as triethylamine and triethanolamine. These basic substances may be used as a mixture thereof. Of these, ammonia is preferable.

There is no limitation imposed for the degree of neutralization for neutralization of the alkali-soluble copolymer, as defined by the ratio of molar equivalent of basic substance to molar equivalent of carboxyl group in the ethylenically unsaturated carboxylic acid monomer. But, the degree of neutralization is usually at least 70%, preferably at least 95%.

The water-soluble resin has a weight average molecular weight of at least 8,000, preferably in the range of 9,000 to 100,000 and more preferably 10,000 to 50,000. If the weight average molecular weight is smaller than 8,000, the resulting image has poor abrasion resistance and poor dot reproducibility. In contrast, if the weight average molecular weight is too large, an aqueous solution of the water-soluble resin has a high viscosity and becomes difficult to handle.

The glass transition temperature of the water-soluble resin can be set without limitation, but is preferably in the range of 5 to 50° C., more preferably 20 to 40° C. When the glass transition temperature is within this range, the resulting image has also good folding endurance and blocking resistance.

The water-soluble resin of the present invention is usually used as an aqueous solution. The solid content in the aqueous solution is usually in the range of 1% to 40% by weight, preferably 20% to 30% by weight. The aqueous solution may contain a water-soluble organic solvent as mentioned below.

The water-soluble resin composition of the present invention comprises the above-mentioned water-soluble resin and a colorant. The amount of water-soluble resin in the composition is preferably in the range of 2 to 200 parts by weight, more preferably 5 to 150 parts by weight and especially preferably 10 to 100 parts by weight, based on 100 parts by weight of colorant.

The colorant used in the present invention is a water-soluble dye or a water-insoluble pigment. A water-insoluble pigment is preferable because the resulting image can have a desired concentration and good light resistance and water resistance.

There is no limitation for the water-soluble dye. Conventional water-soluble dyes for ink can be used provided that, when other ink ingredients are incorporated together, the color tone is not changed and a precipitate is not deposited.

The water-insoluble pigment is also not particularly limited, and includes inorganic pigments and organic pigments. More specifically, the water-insoluble pigment includes, for example, inorganic pigments such as titanium oxide, iron oxide and carbon black which is made by conventional methods such as a contact method, a furnace method or a thermal method, and organic pigments such as azo dyes (including azo lakes, insoluble azo pigments, condensed azo pigments and chelate azo pigments), polycyclic pigments (for example, phthalocyanine pigment, perylene pigment, perinone pigment, anthraquinone pigment, quinacridone pigment, dioxazine pigment, thioindigo pigment, isoindolinone pigment and quinophthalone pigment), dye chalates (for example, basic dye-type chelates and acid dye-type chelates), nitro pigments, nitroso pigments and aniline black.

As specific examples of carbon black used for black ink, there can be mentioned No. 2300, No. 900, MCF 88, No. 33, No. 40, No. 45, No. 52, MA7, MA8, MA100, No. 2200B, which are available from Mitsubishi Chem. Corp.; Raven 5750, Raven 5250, Raven 5000, Raven 3500, Raven 1225 and Raven 700, which are available from Columbia Co.; Regal 400R, Regal 330R, Regal 1660R, Mogul L, Monach 700, Monach800, Monach880, Monach900, Monach 1000, Monach1100, Monach 1300 and Monach 1400, which are available from Cabot Corp.; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4, which are available from Degussa Co.

As specific examples of pigments used for yellow ink, there can be mentioned C. I. Pigment Yellow 1, C. I. Pigment Yellow 2, C. I. Pigment Yellow 3, C. I. Pigment Yellow 12, C. I. Pigment Yellow 13, C. I. Pigment Yellow 14C, C. I. Pigment Yellow 16, C. I. Pigment Yellow 17, C. I. Pigment Yellow 73, C. I. Pigment Yellow 74, C. I. Pigment Yellow 75, C. I. Pigment Yellow83, C. I. Pigment Yellow 93, C. I. Pigment Yellow 95, C. I. Pigment Yellow97, C. I. Pigment Yellow 98, C. I. Pigment Yellow 114, C. I. Pigment Yellow 128, C. I. Pigment Yellow 129, C. I. Pigment Yellow 151 and C. I. Pigment Yellow 154.

As specific examples of pigments used for magenta ink, there can be mentioned C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 57: 1, C. I. Pigment Red 112, C. I. Pigment Red 123, C. I. Pigment Red 168, C. I. Pigment Red 184 and C. I. Pigment Red 202.

As specific examples of pigments used for cyan ink, there can be mentioned C. I. Pigment Blue 1, C. I. Pigment Blue 2, C. I. Pigment Blue 3, C. I. Pigment Blue 15:3, C. I. Pigment Blue 15:34, C. I. Pigment Blue 16, C. I. Pigment Blue 22, C. I. Pigment Blue 60, C. I. Pigment Vat 4 and C. I. Pigment Vat 60.

The pigment preferably has a particle diameter of not larger than 10 μm, more preferably not larger than 1 μm and more preferably not larger than 0.1 μm.

In a preferred embodiment of using a pigment in combination with the water-soluble resin in the present invention, the pigment is used in the form of an aqueous pigment dispersion prepared by dispersing the pigment in an aqueous medium with a dispersant. As the dispersant used for the preparation of the aqueous pigment dispersion, those which are conventionally used for the preparation of pigment dispersions, such as a high polymer dispersant and a surface active agent, can be used.

The high polymer dispersant includes natural high polymer dispersants and synthetic high polymer dispersants. As specific examples of the natural high polymer dispersants, there can be mentioned proteins such as gelatin, casein and albumin; natural rubbers such as gum arabic and tragacanth gum; glucosides such as saponin; alginic acid and its derivatives such as alginic acid propylene glycol ester, alginic acid triethanolamine and ammonium alginate; and cellulose derivatives such as methyl cellulose, carboxymethyl cellulose, hydroxyethyl cellulose and ethylhydroxy cellulose. As specific examples of the synthetic high polymer dispersants, there can be mentioned acrylic resins such as polyacrylic acid, an acrylic acid-acrylonitrile copolymer, a potassium acrylate-acrylonitrile copolymer, a vinyl acetate-acrylic acid ester copolymer and an acrylic acid-acrylic acid ester copolymer; styrene-acrylic resins such as a strene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer; vinyl acetate copolymers such as a vinyl acetate-ethylene copolymer, a vinyl acetate-fatty acid vinyl ester-ethylene copolymer, a vinyl acetate-maleic acid ester copolymer, a vinyl acetate-crotonic acid copolymer and a vinyl acetate-acrylic acid copolymer; and a styrene-maleic acid copolymer, a styrene-maleic anhydride copolymer, a vinylnaphthalene-acrylic acid copolymer, vinylnaphthalene-maleic acid copolymer, polyvinyl alcohol and polyvinyl pyrrolidone, and salts thereof. Of these, a copolymer made from a hydrophobic group-containing monomer and a hydrophilic group-containing monomer, and a copolymer made from a monomer having both a hydrophobic group and a hydrophilic group in the molecule are preferable.

The surface active agent used as a dispersant for pigment includes various anionic surface active agents, cationic active agents and amphoteric surface active agents, which are mentioned below.

In another preferred embodiment of using a pigment in combination with the water-soluble resin in the present invention, the pigment is carbon black having a surface which has been subjected to an oxidation treatment. In this embodiment, the above-mentioned dispersant may not be used. The oxidation treatment can be conducted in a known manner. By the oxidation treatment, a hydrophilic group such as, for example, a carbonyl group, a carboxyl group, a hydroxyl group or a sulfonyl group can be introduced. The carbon black used includes those which are listed above as carbon black for black ink.

The content of water-soluble resin and colorant in the water-soluble resin composition of the present invention is preferably in the range of 0.5% to 50% by weight, more preferably 2% to 30% by weight, as the sum of water-soluble resin and colorant.

The medium used for the preparation of the water-soluble resin composition includes water and water-soluble organic solvents.

As specific examples of the water-soluble organic solvents, there can be mentioned methanol, ethanol, n-propyl alcohol, isopropyl alcohol, n-butanol, sec-butanol, tert-butanol, isobutanol, n-pentanol, ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, N-methyl-2-pyrrolidone, 1,3-dimethyl-2-imidazolidinone, 2-pyrrolidone, glycerin, tripropylene glycol monomethyl ether, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether and diethylene glycol monomethyl ether.

The content of the water-soluble organic solvent is preferably in the range of 10% to 40% by weight, more preferably 10% to 20% by weight.

The water-soluble resin composition of the present invention may further comprises a surface active agent. As specific examples of the surface active agent, there can be mentioned anionic surface active agents such as sodium dodecylbenzenesulfonate, sodium laurylsulfate and ammonium salt of polyoxyethylene alkylether sulfate; and nonionic surface active agents such as polyoxyethylene alkyl ether, polyoxyethylene alkyl ester, polyoxyethylene sorbitan fatty acid ester, polyoxyethylene alkyl phenyl ether, polyoxyethylene alkylamine, polyoxyethylene alkyl amide and acetylene glycol. These surface active agents may be used either alone or as a combination of at least two thereof.

The water-soluble resin composition of the present invention (which may be called as "ink composition" in the present invention) preferably further comprises a tertiary amine, an alkali hydroxide or ammonia.

As specific examples of the tertiary amine, there can be mentioned trimethylamine, triethylamine, triethanolamine, dimethyletanolamine, diethylethanolamine, triisopropanolamine and butyldiethanolamine. These tertiary amines may be used either alone or as a combination of at least two thereof. The amount of tertiary amine is preferably in the range of 0.1% to 10% by weight, more preferably 0.5% to 5% by weight.

The alkali hydroxide includes potassium hydroxide, sodium hydroxide and lithium hydroxide, and its amount is preferably in the range of 0.01% to 5% by weight, more preferably 0.05% to 3% by weight.

According to the need, antiseptic, mildew-proofing agent and phosphorus-containing antioxidant can be incorporated in the ink composition.

The ink composition can be prepared by an appropriate method of mixing and dispersing the above-mentioned ingredients. A preferable method comprises the following steps:

(1) a step wherein a pigment, a high polymer dispersant and ion-exchanged water are mixed together to form a uniform pigment liquid dispersion by an appropriate dispersion mixer such as, for example, a ball mill, a sand mill, an attritor, a roll mill, an agitator mill, a Henschel mixer, a colloid mill, a supersonic homogenizer, a jet mill and ang-mill;

(2) a step wherein the above-mentioned water-resin composition, ion exchanged water, water-soluble organic solvent, antiseptic and mildew-proofing agent are mixed together with stirring to prepare an ink medium;

(3) a step wherein the above-mentioned pigment liquid dispersion prepared in step (1) is gradually dropwise added to the ink medium prepared in step (2), while the mixed liquid is stirred by an appropriate dispersion mixer; and (4) a step wherein the mixed liquid is filtered to remove coarse particles and foreign matter which are liable to cause clogging, whereby the intended ink composition is obtained.

The water-soluble resin composition of the present invention is suitable for an aqueous ink, for example, an aqueous gravure ink, an aqueous flexo ink and an aqueous ink for ink-jet recording. It is suitable further for an aqueous coating liquid.

The invention will now be described by the following examples that by no means limit the scope of the invention. % and parts in the examples are by weight unless otherwise specified.

Properties of copolymers and water-soluble resin compositions were evaluated by the following methods.

(Acid Value of Copolymer)

Acid value of a copolymer was determined according to JIS K0070. The acid value is expressed by the amount of potassium hydroxide (KOH mg/g) required for neutralizing a carboxyl group in 1 g of copolymer.

(Viscosity of Aqueous Water-Soluble Resin Solution)

Viscosity of an aqueous water-soluble resin solution was measured at a temperature of 25° C. and a revolution of 60 rpm by using a BM type viscometer available from Tokimec Inc.

(Weight Average Molecular Weight of Copolymer)

Weight average molecular weight of a copolymer was determined by GPC using tetrahydrofuran as elute and a calibration curve of standard polystyrene.

(Glass Transition Temperature of Copolymer)

Glass transition temperature of a copolymer was measured by a highly sensitive differential scanning calorimeter "RDC 220" available from Seiko Denshi Kogyo K. K. at a temperature elevating rate of 10° C./min.

(Storage Stability of Water-Soluble Resin Composition)

Viscosity (V0) of a water-soluble resin composition was measured at a temperature of 25° C. by using a BM type viscometer (available from Tokyo Keiki K. K.). Thereafter the composition was stored at 40° C. in a thermostat for 40 days, and then, cooled to 25° C. Then the cooled composition was stirred for 30 minutes by a magnetic stirrer, and its viscosity (V1) was measured at a temperature of 25° C. by using a BM type viscometer (available from Tokyo Keiki K. K.). From the measured viscosities V0 an V1, viscosity change (%) with lapse of days was determined according to the following formula.

$$\text{Viscosity change (\%) with lapse of days} = [(V1-V0) \times 100]/V0 \quad (1)$$

(Abrasion Resistance)

A water-soluble resin composition was coated on wood-free paper by an applicator to form a wet coating having a thickness of 0.0006 inch, and the wet coating was dried at room temperature for 20 minutes. The dried coating was rubbed with a tip of finger-nail. The rubbed coating was visually observed by naked eyes and evaluated according to the following three ratings.

A: no stain mark was observed.

B: slight stain mark was observed.

C: Great stain mark was observed.

(Dot Reproducibility)

A drop of water-soluble resin was fallen on woodfree paper by a syringe. The diameter of drop was adjusted to about 30 mm as measured by the Y axis scale of a static contact angle measuring apparatus (type CA-A available from Kyowa Kaimen Kagaku K. K. Contact angle was measured immediately after the falling of drop and 5 minutes later after the falling of drop (the measured contact angles are referred to as θ0 and θ5, respectively). Change of static contact angle with time was calculated from the following formula (2).

Change of static contact angle with time=θ5/θ0     (2)

The change of static contact angle with time is usually not larger than 1. The change of static contact angle with time is expressed by the following three ratings.

A: change of static contact angle with time is at least 0.9. Dot reproducibility is evaluated as excellent.

B: change of static contact angle with time is at least 0.7 but smaller than 0.9. Dot slightly blots in a state of whiskers.

C: change of static contact angle with time is smaller than 0.7. Dot blots greatly and contour of dot becomes unclear.

(Folding Endurance)

A water-soluble resin composition was coated on one surface of woodfree paper by an applicator to form a wet coating having a thickness of 0.0006 inch, and the wet coating was dried at room temperature for 20 minutes. The coating was further dried at 50° C. for 10 minutes. The dried coated paper was folded double so that the coated surface was contacted with each other. Then the folded paper was reversely folded double so that the non-coated surface was contacted with each other. This folding-reverse folding procedure was repeated, and folding endurance was evaluated according to the following three ratings.

A: no separation of coating was observed at the crease when the folding-reverse folding procedure was repeated five times.

B: separation of coating was observed at the crease when the folding-reverse folding procedure was repeated two times.

C: separation of coating was observed at the crease when the folding-reverse folding procedure was conducted once.

(Blocking Resistance)

A water-soluble resin composition was coated on one surface of woodfree paper by an applicator to form a wet coating having a thickness of 0.0006 inch, and the wet coating was dried at room temperature for 20 minutes. The coating was further dried at 50° C. for 10 minutes. The dried coated paper was folded double so that the coated surface was contacted with each other. A load of 20 g/cm² was imposed onto the folded paper at 250° C. over a period of 24 hours. Thereafter the folded paper was unfolded, and the coated surface was observed. The blocking resistance was expressed according to the following two ratings.

A: blocking due to the close contact of coated surface with each other was not observed.

B: partial separation of coating due to the close contact of coated surface with each other was observed.

EXAMPLE 1

An aqueous dispersion of a monomer mixture was prepared by mixing together 56 parts of ethyl acrylate, 36 parts of methyl methacrylate, 8 parts of methacrylic acid, 3 parts of octyl thioglycollate as a chain transfer agent, 2.5 parts of polyvinyl alcohol having a weight average molecular weight of 24,000 and a saponification degree of 88% by mole and 80 parts of ion-exchanged water.

Another reaction vessel was charged with 90 parts of ion-exchanged water having dissolved therein 0.05 part of ethylenediaminetetraacetic acid. The temperature of the content was elevated to 80° C., and 40 parts of an aqueous 5% potassium persulfate solution was added. Then, the above-mentioned aqueous dispersion of monomer mixture was continuously added over a period of 2 hours to carry out polymerization. After completion of the continuous addition, polymerization was further continued at 80° C. for 30 minutes. The polymerization conversion reached at least 99%.

A part of the as-produced copolymer was taken, dried, thoroughly washed with water, and then vacuum-dried at 50° C. to give a copolymer. Acid value of the copolymer was measured. The result is shown in Table 1.

Then, an aqueous 28% ammonia solution in an equimolar amount to the initially charged methacrylic acid, and 2 parts of an aqueous sodium persulfate solution were added to the polymerization mixture in the reaction vessel. The content was maintained at 80° C. for 1 hour, and then, an appropriate amount of ion-exchanged water was added to give an aqueous water-soluble resin solution A having a solid content of 25%. The viscosity of the water-soluble resin solution A is shown in Table 1.

A part of the water-soluble resin solution A was taken, placed in an aluminum dish, dried at room temperature and further dried in vacuum at 40° C. Weight average molecular weight and glass transition temperature of the thus-obtained water-soluble resin were measured. The results are shown in Table 1.

40 parts of the water-soluble resin solution A having a solid content of 25%, 5 parts of ethylene glycol, 4 parts of ion-exchanged water and 1 part of triethanolamine were mixed together with stirring, and then, 50 parts of a carbon black dispersion (WA color A250 available from Dainichi-seika Color and Chemicals Mfg. Co., solid content: 20%, dominant particle diameter: 117 μm) was gradually added to the mixture. After completion of the addition, the resulting mixture was stirred further for 1 hour, and then, filtered through a membrane filter having pore diameter of 5 μm to give a water-soluble resin composition having a solid content of 20%.

Storage stability, abrasion resistance and change of static contact angle with time of the water-soluble resin composition were evaluated. The results are shown in Table 1.

EXAMPLE 2

The procedures described in Example 1 for the preparation and evaluation of a water-soluble resin composition were repeated wherein the amount of octyl thioglycollate used for the preparation of the aqueous water-soluble resin solution was changed from 3 parts to 0.3 part with all other conditions remaining the same. The results are shown in Table 1.

EXAMPLE 3

The procedures described in Example 1 for the preparation and evaluation of a water-soluble resin composition were repeated wherein ammonium polyoxyethylene-alkylpropenyl-ether-sulfate ("Aqualon HS-10" available from Dai-ichi Kogyo Seiyaku Co.) was used instead of polyvinyl alcohol for the preparation of the aqueous water-soluble resin solution with all other conditions remaining the same. The results are shown in Table 1.

COMPARATIVE EXAMPLE 1

The procedures described in Example 1 for the preparation and evaluation of a water-soluble resin composition were repeated wherein sodium laurylsulfate was used instead of polyvinyl alcohol for the preparation of the aqueous water-soluble resin solution with all other conditions remaining the same. The results are shown in Table 1.

COMPARATIVE EXAMPLES 2 AND 3

The procedures described in Example 1 for the preparation and evaluation of a water-soluble resin composition were repeated wherein the monomer composition and the amount of octyl thioglycollate, used for the preparation of the aqueous water-soluble resin solution, were changed as shown in Table 1 with all other conditions remaining the same. The results are shown in Table 1.

relatively small viscosity change with lapse of days, but has very poor abrasion resistance and very poor dot reproducibility (Comparative Example 2).

A water-soluble resin composition comprising a water-soluble resin prepared by using a copolymer having an acid value larger than that stipulated in the present invention exhibits good dot reproducibility, but exhibits very large viscosity change with lapse of days and very poor abrasion resistance (Comparative Example 3).

In contrast, a water-soluble resin composition comprising a water-soluble resin satisfying the requirements of the present invention exhibits low viscosity change with lapse of days, good abrasion resistance and good dot reproducibility (Examples 1, 2 and 3). Especially, a water-soluble resin composition comprising a water-soluble resin prepared by copolymerization conducted in the presence of polyvinyl alcohol exhibits very low viscosity change with lapse of days and excellent dot reproducibility (Examples 1 and 2). Water-soluble resin solution A comprising a water-soluble resin having a relatively low weight average molecular weight had good handling properties (Example 1).

TABLE 1

|  | Example | | | Comp. Example | | |
|---|---|---|---|---|---|---|
|  | 1 | 2 | 3 | 1 | 2 | 3 |
| Monomer composition (parts) | | | | | | |
| Ethyl acrylate | 56 | 56 | 56 | 56 | 56 | 61 |
| Methyl methacrylate | 36 | 36 | 36 | 36 | 36 | 16 |
| Methacrylic acid | 8 | 8 | 8 | 8 | 8 | 23 |
| Chain transfer agent | | | | | | |
| Octyl thioglycollate | 3 | 0.3 | 3 | 3 | 10 | 3 |
| Dispersion stabilizer (parts) | | | | | | |
| Polyvinyl alcohol | 2.5 | 2.5 | — | — | 2.5 | 2.5 |
| Aqualon H5-10 | — | — | 2.5 | — | — | — |
| Sodium laurylsulfate | — | — | — | 2.5 | — | — |
| Aq. water-soluble resin solution (solid content: 25%) | A | B | C | D | E | F |
| Solution viscosity (mPa · s) | 8700 | 18500 | 250 | 360 | 16 | 70 |
| Properties of copolymer | | | | | | |
| Acid value (KOH mg/g) | 53 | 51 | 50 | 50 | 48 | 152 |
| Wt. av. molecular weight | 10800 | 85000 | 11300 | 10300 | 3500 | 10400 |
| Glass transition temp. (° C.) | 25 | 26 | 24 | 25 | 23 | 27 |
| Properties of water-soluble resin composition | | | | | | |
| Viscosity change with lapse of days (%) | 40 | 46 | 120 | 15 | 88 | 4025 |
| Abrasion resistance | A | A | A | B | C | C |
| Change of static contact angle with time | 0.94 | 0.96 | 0.74 | 0.73 | 0.51 | 0.94 |
| Dot reproducibility | A | A | B | B | C | A |

The following will be seen from Table 1.

A water-soluble resin composition comprising a water-soluble resin made by using a non-polymerizable surface active agent, conventionally used in emulsion polymerization, exhibits a small viscosity change with lapse of days, but has poor abrasion resistance and poor dot reproducibility (Comparative Example 1).

A water-soluble resin composition comprising a water-soluble resin having a weight average molecular weight lower than that stipulated in the present invention exhibits a

EXAMPLES 4 TO 7

The procedures described in Example 1 for the preparation and evaluation of a water-soluble resin composition were repeated wherein the monomer composition for the preparation of the aqueous water-soluble resin solution was changed as shown in Table 2 with all other conditions remaining the same. The results are shown in Table 1. Further, folding endurance and blocking resistance of the water-soluble resin composition were evaluated. The results are shown in Table 2.

TABLE 2

| | Example | | | |
|---|---|---|---|---|
| | 4 | 5 | 6 | 7 |
| Monomer composition (parts) | | | | |
| Ethyl acrylate | 79 | 60 | 44 | 30 |
| Methyl methacrylate | 13 | 32 | 48 | 62 |
| Methacrylic acid | 8 | 8 | 8 | 8 |
| Chain transfer agent | | | | |
| Octyl thioglycollate | 3 | 3 | 3 | 3 |
| Dispersion stabilizer (parts) | | | | |
| Polyvinyl alcohol | 2.5 | 2.5 | 2.5 | 2.5 |
| Aq. water-soluble resin solution (solid content: 25%) | G | H | I | J |
| Solution viscosity (mPa·s) | 7500 | 8300 | 8500 | 9100 |
| Properties of copolymer | | | | |
| Acid value (KOH mg/g) | 52 | 49 | 51 | 50 |
| Wt. av. molecular weight | 10500 | 10200 | 10300 | 10600 |
| Glass transition temp. (° C.) | 0 | 20 | 39 | 62 |
| Properties of water-soluble resin composition | | | | |
| Viscosity change with lapse of days (%) | 50 | 44 | 53 | 48 |
| Abrasion resistance | A | A | A | A |
| Change of static contact angle with time | 0.95 | 0.92 | 0.91 | 0.93 |
| Dot reproducibility | A | A | A | A |
| Folding endurance | A | A | B | C |
| Blocking resistance | B | A | A | A |

As seen from Table 2, in Examples 4 to 7 wherein the monomer composition was varied so that copolymers having different glass transition temperatures were prepared, all of the water-soluble resin compositions exhibited a low viscosity change with lapse of days, and good abrasion resistance and good blocking resistance. Especially, water-soluble resin compositions made from the copolymers having a glass transition temperature shown in Examples 5 and 6 in Table 2 exhibited good folding endurance and good blocking resistance.

INDUSTRIAL APPLICABILITY

In accordance with the present invention, there are provided a water-soluble resin having a weight average molecular weight of at least 8,000, which is prepared by polymerizing an ethylenically unsaturated carboxylic acid monomer and a monomer copolymerizable therewith in the presence of an alcoholic hydroxyl group-containing water-soluble high polymer or a copolymerizable surface active agent to give a copolymer having an acid value of 5 to 120 and then neutralizing the thus-obtained copolymer with a basic substance; and a process for producing the water-soluble resin. A water-soluble resin composition comprising the water-soluble resin and a colorant exhibits a low viscosity change even when it is stored for a long period, and gives an image having good dot reproducibility and good abrasion resistance.

The invention claimed is:

1. A process for producing a water-soluble resin which is a copolymer having a weight average molecular weight of at least 8,000, characterized in that an ethylenically unsaturated carboxylic acid monomer and a monomer copolymerizable therewith are polymerized in the presence of an alcoholic hydroxyl group-containing water-soluble high polymer or a copolymerizable surface active agent, and in the absence of or in the presence of smaller than 0.05 part by weight, based on 100 parts by weight of the monomers, of a non-polymerizable surface active agent, in an aqueous medium to give a copolymer having an acid value in the range of 10 to 90, and then, the thus-obtained copolymer is neutralized with a basic substance.

2. The process for producing a water-soluble resin according to claim 1, wherein a chain transfer agent is used for the polymerization.

3. The process for producing a water-soluble resin according to claim 2, wherein the chain transfer agent is a thioglycolic acid ester.

4. The process for producing a water-soluble resin according to claim 1, wherein the alcoholic hydroxyl group-containing water-soluble high polymer or the copolymerizable surface active agent, a mixture of the monomers, and the optional non-polymerizable surface active agent are separately added in a polymerization vessel in a manner such that the addition of these ingredients are substantially simultaneously commenced.

5. The process for producing a water-soluble resin according to claim 1, wherein the alcoholic hydroxyl group-containing water-soluble high polymer or the copolymerizable surface active agent, a mixture of the monomers, and the optional non-polymerizable surface active agent are added in a polymerization vessel as a mixture of these ingredients in the form of an aqueous dispersion comprising these ingredients and water.

* * * * *